United States Patent
Coldicott et al.

(10) Patent No.: US 9,123,004 B2
(45) Date of Patent: Sep. 1, 2015

(54) PREDICTING AN EFFECT OF EVENTS ON ASSETS

(75) Inventors: Peter A. Coldicott, Jonestown, TX (US); Thomas T. Hanis, Raleigh, NC (US); Eoin Lane, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 13/433,384

(22) Filed: Mar. 29, 2012

(65) Prior Publication Data

US 2013/0262367 A1 Oct. 3, 2013

(51) Int. Cl.
*G06Q 10/06* (2012.01)
(52) U.S. Cl.
CPC .................... *G06Q 10/06* (2013.01)
(58) Field of Classification Search
CPC .............. G06F 9/44; G06N 7/02; G06N 7/06; G06N 5/048; G06N 5/04; G06N 99/005; G06Q 10/06; G06Q 10/0631; G06Q 10/0635
USPC ......................................... 706/52, 46, 45, 62
See application file for complete search history.

(56) References Cited

U.S. PATENT DOCUMENTS

| 7,467,145 B1 * | 12/2008 | Castellanos et al. .................. 1/1 |
| 2004/0034652 A1 * | 2/2004 | Hofmann et al. .............. 707/102 |
| 2007/0074076 A1 * | 3/2007 | Imai et al. ........................ 714/26 |
| 2007/0288219 A1 * | 12/2007 | Zafar et al. ....................... 703/14 |
| 2009/0248488 A1 | 10/2009 | Shah et al. |
| 2009/0287674 A1 * | 11/2009 | Bouillet et al. .................... 707/5 |
| 2009/0299696 A1 * | 12/2009 | Shiihara et al. ............... 702/181 |
| 2010/0049564 A1 | 2/2010 | Lewis et al. |
| 2010/0100546 A1 * | 4/2010 | Kohler .......................... 707/739 |
| 2010/0162401 A1 | 6/2010 | Sakaki |
| 2011/0099050 A1 * | 4/2011 | Coldicott et al. ............ 705/7.37 |
| 2011/0099139 A1 * | 4/2011 | Coldicott et al. ............... 706/47 |
| 2011/0099536 A1 * | 4/2011 | Coldicott et al. ............. 717/120 |
| 2012/0102371 A1 * | 4/2012 | Tonouchi ........................ 714/49 |
| 2012/0155715 A1 * | 6/2012 | Buscema ....................... 382/113 |
| 2012/0278353 A1 * | 11/2012 | Carrato et al. ................ 707/769 |

FOREIGN PATENT DOCUMENTS

WO 0042529 7/2000

OTHER PUBLICATIONS

Kim et al, "Cause-and-Effect Function Analysis", Proceedings of the 2010 IEEE ICMIT.*

(Continued)

*Primary Examiner* — Jeffrey A Gaffin
*Assistant Examiner* — Ilya Traktovenko
(74) *Attorney, Agent, or Firm* — Brown & Michaels, PC; Mark Vallone

(57) ABSTRACT

A method, computer program product and computer system for predicting that an event identified in an event topic map meta-model will have an effect on at least one asset identified in an asset topic map meta-model. In an exemplary embodiment, a computer receives a query input from a user. The computer obtains an input of an event from the query input. The computer identifies at least one asset mapped to the event in an asset to event topic map meta-model that maps assets in the asset topic map meta-model to events in the event topic map meta-model. In identifying the at least one asset, the computer determines that the at least one asset has greater than a threshold probability of being affected by the event.

25 Claims, 9 Drawing Sheets

(56) References Cited

OTHER PUBLICATIONS

Potgieter et al, "Adaptive Bayesian agents: Enabling distributed social networks", S.Afr.J.Bus.Manage.2006, 37(1).*

Reusch et al, "Integrated Tool Sets for Business Games and Simulation", Computing, 2008, vol. 7, Issue 2, 59-65.*

Rouse, "Topic Map Query language (TMQl)", Sep. 2005.*

Ruther, "Sharing Environmental Vocabulary", EnviroInfo 2004 (Geneva), p. 293-295, 18th International Conference "Informatics for Environmental Protection", Geneva, 2004.*

Ruther et al. "SNS Environmental Vocabulary—from Terms to Ontology", Semantics 2006 Vienna, 28-30.11.2006.

* cited by examiner

PREDICTING AN EFFECT OF EVENTS ON ASSETS

TECHNICAL FIELD

The present invention relates to semantic mapping, and more specifically to semantic mapping of event topic map meta-models to asset topic map meta-models to predict an effect of events on assets.

BACKGROUND

Manufacturing based companies have enormous investments in assets that are part of the operational processes that drive their business. Optimizing the use of those assets is critical to a company's operational effectiveness and therefore its bottom line.

The equipment or assets that run the manufacturing or production processes are generally connected to servers or controllers to generate operational data that can be used to monitor the manufacturing or production process. Typically, companies will collect the operational data and perform operational analysis to provide immediate performance characteristics that can often be represented in dashboards, score sheets, or reports. Information models can be used to represent how assets are deployed and the relationships between assets such as connections, associations or containment. Armed with both the model information and the "real time" operational data organizations can perform current or future condition analysis on assets and asset groups.

Similarly, organizations may use event models to understand relationships between events within their physical infrastructure. These event models may be explicitly defined, or they could be implicit in the deployment of business operational processes. These processes could be programmatic, rule based, or supplied by a knowledge expert. But independent of how they are manifested, they represent relationships between events that occur within the operational process. For example, the event model would be able to tell a customer what response needs to occur if a critical piece of equipment is operating over a specific threshold, for example running too hot or consuming too much power.

SUMMARY

According to one embodiment of the present invention, a method of predicting that an event identified in an event topic map meta-model will have an effect on at least one asset identified in an asset topic map meta-model. The method includes a computer receiving a query input from a user. The method further includes the computer obtaining, from the query input, an input of an event. The method further includes the computer identifying at least one asset mapped to the event in an asset to event topic map meta-model that maps assets in the asset topic map meta-model to events in the event topic map meta-model. The step of identifying the at least one asset includes the computer determining that the at least one asset has greater than a threshold probability of being affected by the event.

According to another embodiment of the present invention, a computer program product for predicting that an event identified in an event topic map meta-model will have an effect on at least one asset identified in an asset topic map meta-model. The computer program product includes one or more computer-readable tangible storage devices. The computer program product further includes program instructions, stored on at least one of the one or more storage devices, to receive a query input from a user. The computer program product further includes program instructions, stored on at least one of the one or more storage devices, to obtain, from the query input, an input of an event. The computer program product further includes program instructions, stored on at least one of the one or more storage devices, to identify at least one asset mapped to the event in an asset to event topic map meta-model that maps assets in the asset topic map meta-model to events in the event topic map meta-model. The program instructions to identify the at least one asset determine that the at least one asset has greater than a threshold probability of being affected by the event. The computer program product further includes program instructions, stored on at least one of the one or more storage devices, to display a probability that the event will affect the mapped at least one asset.

According to another embodiment of the present invention, a computer system for predicting that an event identified in an event topic map meta-model will have an effect on at least one asset identified in an asset topic map meta-model. The computer system includes one or more processors, one or more computer-readable memories, and one or more computer-readable tangible storage devices. The computer system further includes program instructions, stored on at least one of the one or more storage devices for execution by at least one of the one or more processors via at least one of the one or more memories, to receive a query input from a user. The computer system further includes program instructions, stored on at least one of the one or more storage devices for execution by at least one of the one or more processors via at least one of the one or more memories, to obtain, from the query input, an input of an event. The computer system further includes program instructions, stored on at least one of the one or more storage devices for execution by at least one of the one or more processors via at least one of the one or more memories, to identify at least one asset mapped to the event in an asset to event topic map meta-model that maps assets in the asset topic map meta-model to events in the event topic map meta-model. The program instructions to identify the at least one asset determine that the at least one asset has greater than a threshold probability of being affected by the event. The computer system further includes program instructions, stored on at least one of the one or more storage devices for execution by at least one of the one or more processors via at least one of the one or more memories, to display a probability that the event will affect the mapped at least one asset.

DETAILED DESCRIPTION

The illustrative embodiments recognize that, for effective operations, companies want to be able to answer more complicated questions about the operations of their equipment and/or assets and the result of various types of events. Examples are questions like: "What are the implications of this piece of equipment exceeding a threshold to other assets in my enterprise?" "What are implications to assets that are related by proximity, direct or indirect physical connection based on configurations that exist now or that could change by operational cycles or time?" "What are the implications to the events that will be triggered by my operational choices to resolve the immediate threshold problem?" The illustrative embodiments recognize that these questions are critical to a highly effective operational process and span the boundaries typically maintained by asset models and event models individually.

The illustrative embodiments recognize that models, such as asset models and event models, are deployed in relative isolation and do not provide a semantic understanding between the models. The illustrative embodiments also recognize that simply expanding the model definitions to attempt to include any relationship across the separate models, sacrifices the benefits associated with specifically focused models. Illustrative embodiments provide for interaction between individual models so that the collective values of the individual models can be fully leveraged to drive optimal business efficiencies.

Figure 1:
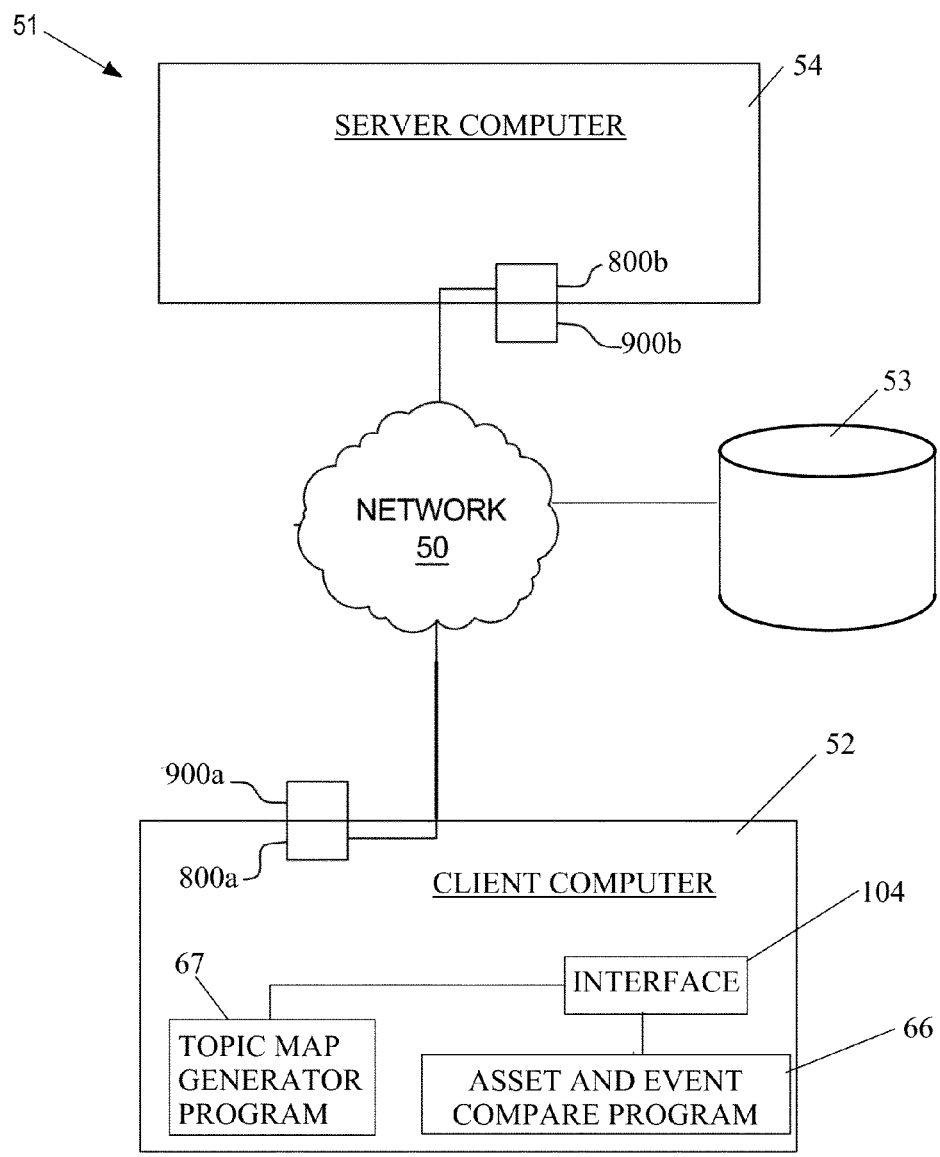
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, client computer 52, storage unit 53, and server computer 54 connect to network 50. In other exemplary embodiments, network data processing system 51 may include additional client computers, storage devices, server computers, and other devices not shown. Client computer 52 includes a set of internal components 800a and a set of external components 900a, further illustrated in FIG. 9. Client computer 52 may be, for example, a mobile device, a cell phone, a personal digital assistant, a netbook, a laptop computer, a tablet computer, a desktop computer, or any other type of computing device. Client computer 52 may contain an interface 104. Through interface 104, users may view different topic maps as well as an asset to event topic map. Additionally, through interface 104, graphs of which assets are affected by which events and preferably the probability of whether an event will affect assets, may be displayed on the asset to event topic map. Interface 104 may accept commands and data entry from a user, such as additional events or assets. Interface 104 can be, for example, a command line interface, a graphical user interface (GUI), or a web user interface (WUI) through which a user can access an asset and event compare program 66 and/or a topic map generator program 67 on client computer 52, as shown in FIG. 1, or alternatively on server computer 54. Server computer 54 includes a set of internal components 800b and a set of external components 900b illustrated in FIG. 9.

In the depicted example, server computer 54 provides information, such as boot files, operating system images, and applications to client computer 52. Server computer 54 can compute the information locally or extract the information from other computers on network 50.

Figure 9:
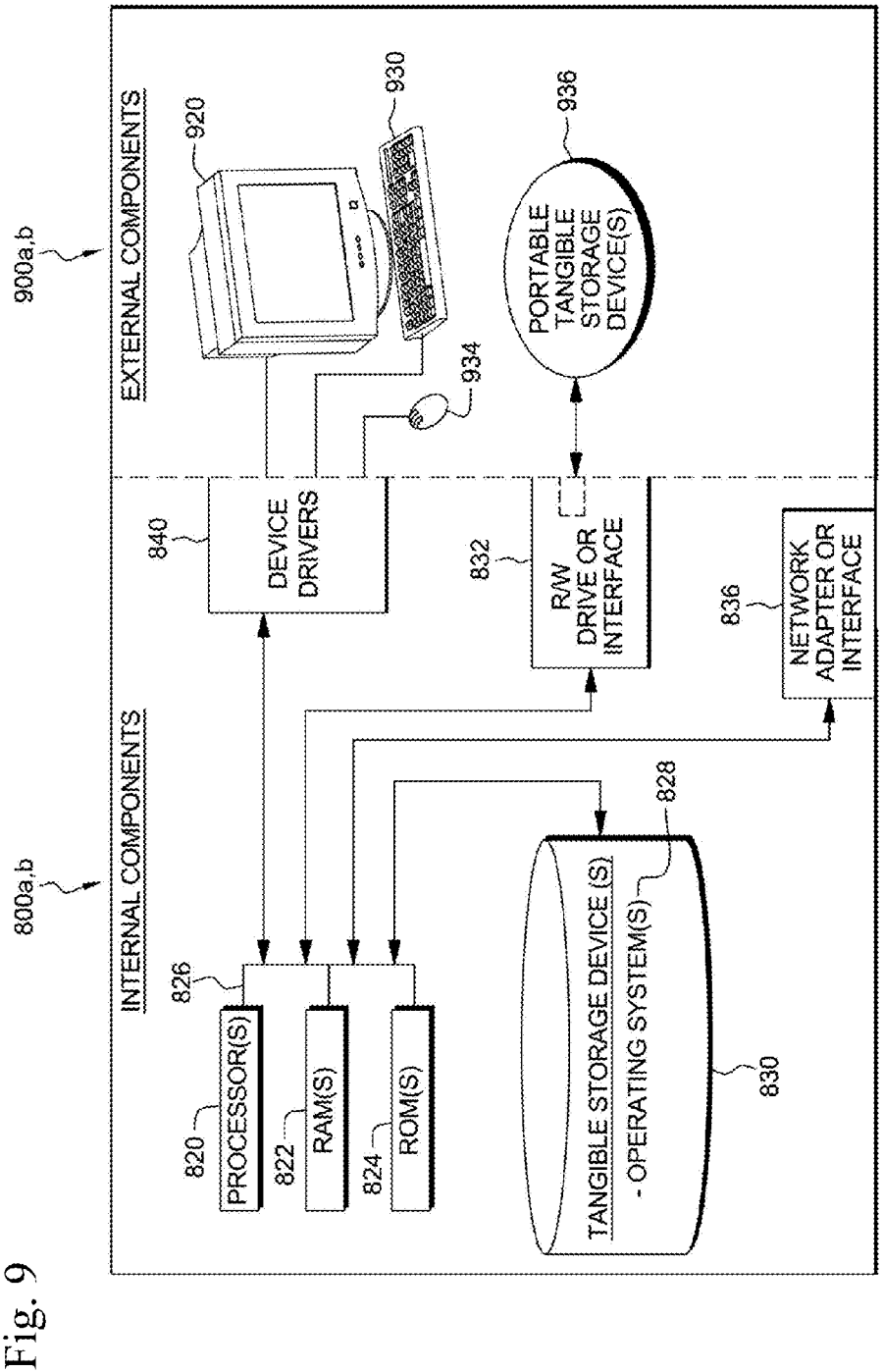
FIG. 9 illustrates internal and external components of a client computer and a server computer in which illustrative embodiments may be implemented.

Program code, meta-models, asset models, event models, and programs such as topic map generator program 67 and asset and event compare program 66 may be stored on at least one of one or more computer-readable tangible storage devices 830 shown in FIG. 9, on at least one of one or more portable computer-readable tangible storage devices 936 as shown in FIG. 9, or on storage unit 53 connected to network 50, or may be downloaded to a computer, such as client computer 52 or server computer 54, for use. For example, program code, meta-models, asset models, event models, and programs such as topic map generator program 67 and asset and event compare program 66 may be stored on at least one of one or more tangible storage devices 830 on server computer 54 and downloaded to client computer 52 over network 50 for use on client computer 52. Alternatively, server computer 54 can be a web server, and the program code, meta-models, asset models, event models, and programs such as topic map generator program 67 and asset and event compare program 66 may be stored on at least one of the one or more tangible storage devices 830 on server computer 54 and accessed on client computer 52. Topic map generator program 67 and asset and event compare program 66 can be accessed on client computer 52 through interface 104. In other exemplary embodiments, the program code, meta-models, asset models, event models, and programs such as topic map generator program 67 and asset and event compare program 66 may be stored on at least one of one or more computer-readable tangible storage devices 830 on client computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2:
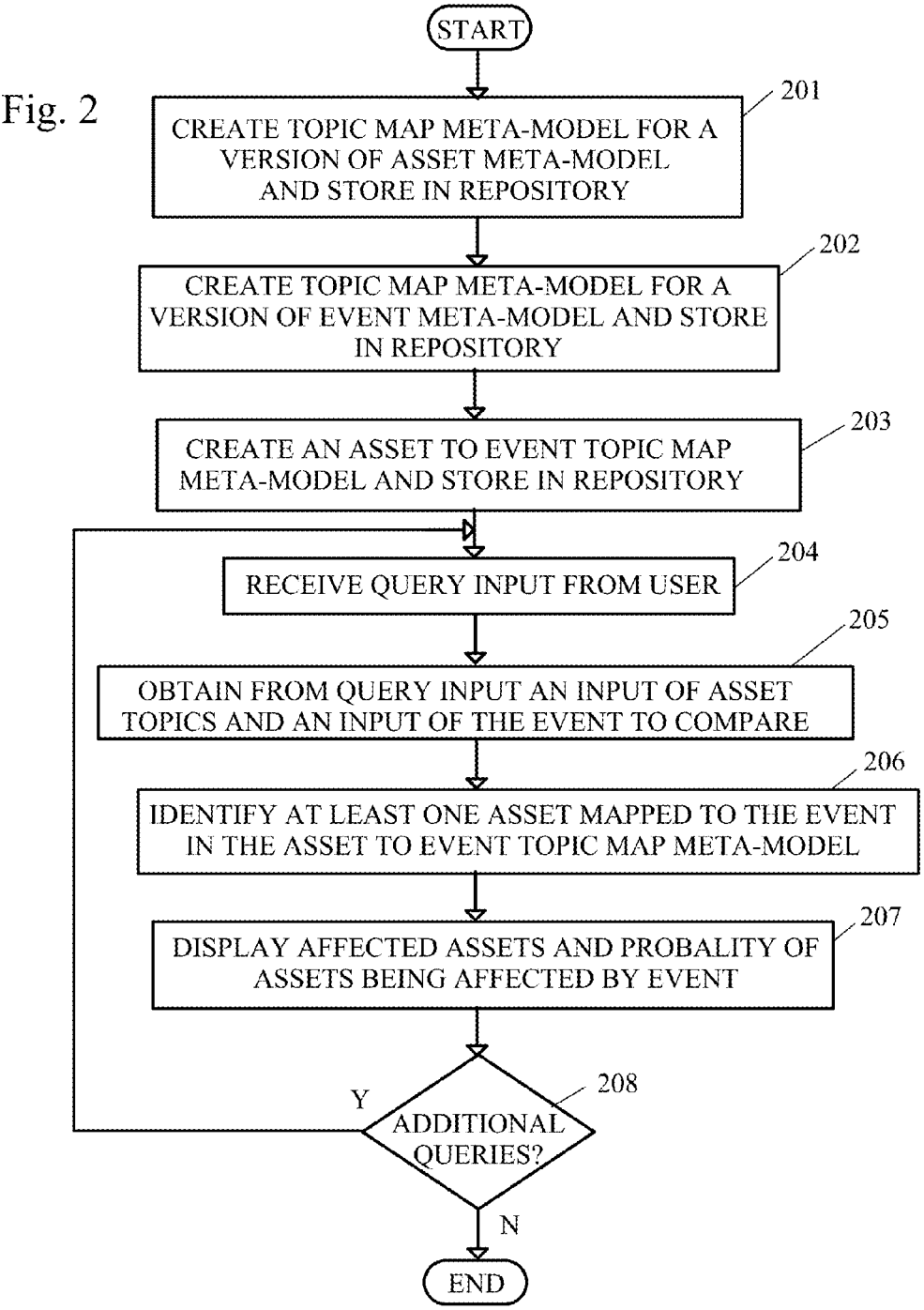
FIG. 2 shows a flowchart of a method of semantically mapping an asset topic map meta-model to an event topic map meta-model to predict that an event will have an effect on at least one asset, according to an illustrative embodiment.

FIG. 2 shows a flowchart of a method of semantically mapping an asset topic map meta-model to an event topic map meta-model to predict that an event will have an effect on at least one asset, according to an illustrative embodiment.

Figure 3:
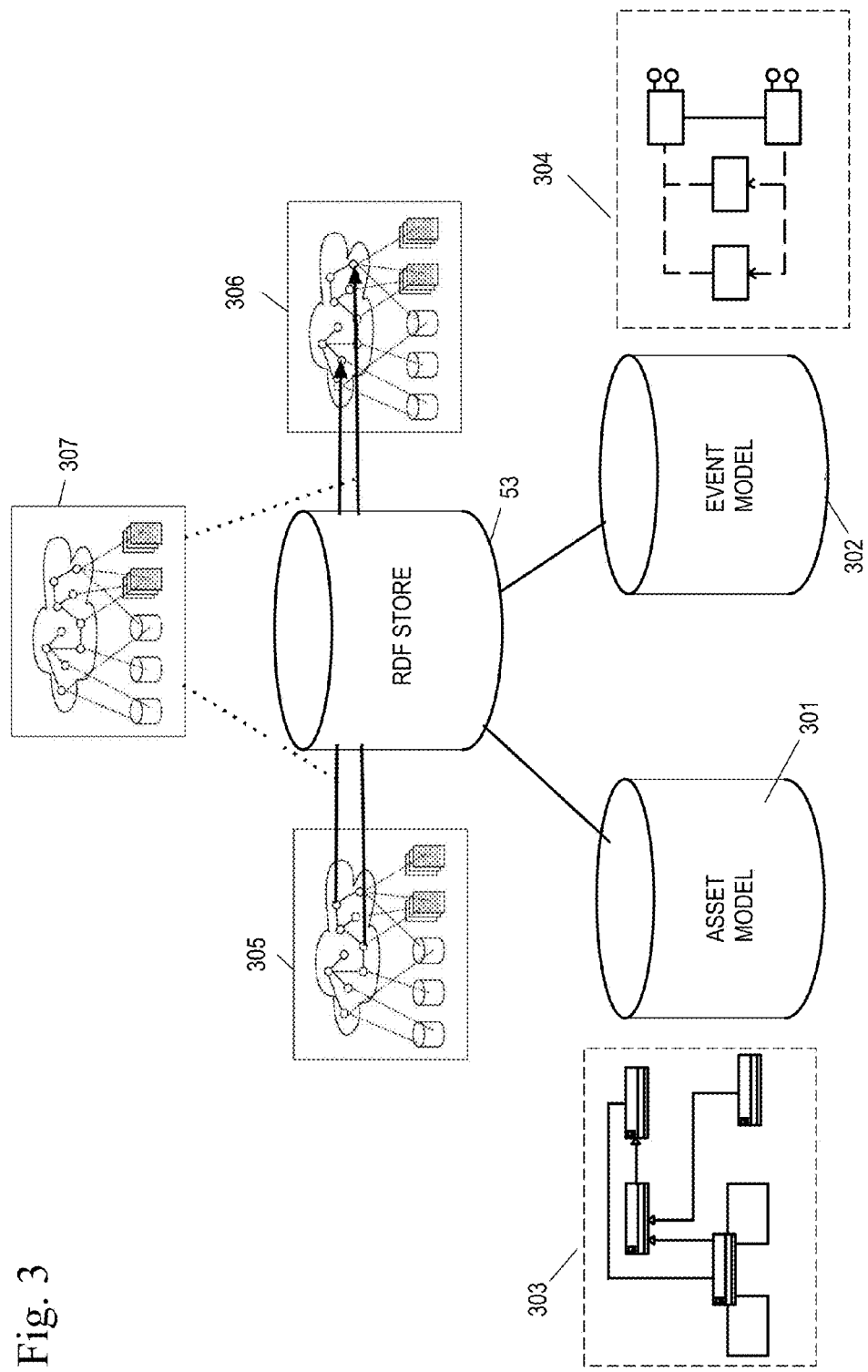
FIG. 3 shows an example of a possible relationship between an asset topic map meta-model, an event topic map meta-model and an asset to event topic map meta-model that maps assets in the asset topic map meta-model to events in the event topic map meta-model.

Topic map generator program 67 creates a topic map meta-model, including a topic map based index and instance ontology, of an asset meta-model and stores the created asset topic map meta-model in a repository (step 201). The repository may be repository 301 as shown in FIG. 3. It should be noted that while separate repositories 301, 302 for the different meta-models are shown in FIG. 3, one repository may be used.

Topic map generator program 67 creates a topic map meta-model, including a topic map based index and instance ontology, for an event meta-model and stores the created event topic map meta-model in a repository (step 202).

The repository may be repository 302 as shown in FIG. 3.

Asset and event compare program 66 creates an asset to event topic map meta-model that maps assets in the asset topic map meta-model created at step 201 to events in the event topic map meta-model created at step 202 and stores the asset to event topic map meta-model in a repository (step 203). The asset to event topic map meta-model may be created manually by a person with knowledge of how specific events affect assets or by asset and event compare program 66. Asset and event compare program 66 can recursively recreate the asset to event topic map meta-model as new events are generated.

In creating the asset to event topic map meta-model, asset and event compare program 66 can determine what asset(s) in the asset topic map meta-model created at step 201 may be affected by an event in the event topic map meta-model created at step 202. In at least one embodiment, asset and event compare program 66 can determine what asset(s) in the asset topic map meta-model created at step 201 may be affected by an event in the event topic map meta-model created at step 202 based on historical factual effects of one or more events on one or more assets. The historical effects of the one or more events on the one or more assets may be inputted from a user or obtained from various databases.

In at least one embodiment, asset and event compare program 66 can determine what asset(s) in the asset topic map meta-model created at step 201 may be affected by an event in the event topic map meta-model created at step 202 based on a projected effect. For example, if a predicted extreme weather event could cause local floods, asset and event compare program 66 can project that the extreme weather event would affect one or more water related assets, such as water pipes and drains, and would thus map the extreme weather event to the one or more water related assets.

In at least one embodiment, asset and compare program 66 can determine that one or more assets in the asset topic map meta-model created at step 201 may be affected by an event in the event topic map meta-model created at step 202 if the one or more assets have greater than a threshold probability of being affected by the event. For example, historically, a tropical storm of specific magnitude will have a high probability of affecting sewer drain pipes and above ground power lines, but not power lines that lie underneath the ground or buildings. In at least one embodiment, asset and compare program 66 can calculate the probability that an asset will be affected by an event using Bayesian methodology. In one embodiment, asset and compare program 66 can cause the probability to be displayed on the asset to event topic map meta-model.

Asset and event compare program 66 receives a query input for use in predicting which asset(s) specified in the query input will be affected by an event specified in the query input (step 204). Asset and event compare program 66 can receive the query input from a user through an interface, such as interface 104. Interface 104 may be a topic map interface, which may be a representational state transfer (REST) based interface, although other interfaces may be used. A REST interface is preferably used since REST is a standards-based Internet protocol and is self documenting in terms of how to do the search, for example which domain to search, and which topic to search.

In one embodiment, the query input includes at least one domain. For example, the query input can have the following syntax:

/search/<<domain>>/

The domain of the query input is the event to the overall system to be searched, for example the asset to event topic map meta-model. An example of a query input received at step 204 to predict what asset(s) will be affected by a specific event, in this case a flood, is as follows:

/search/<<flood>>/

Responsive to receiving this query input, asset and event compare program 66 can identify every asset that would be affected by a flood.

Alternatively, the query input may include at least one domain and at least one a topic. For example, the query input can have the following syntax:

/search/<<domain>>/<<topic>>/

The domain of the query input is the event to apply to the overall system to be searched. The topic of the query input is the asset(s) that the event may affect. An example of a query input received at step 204 to predict what asset(s) (WorkEquipment, see asset topic map of FIG. 6) will be affected by a specific event (a flood, see event topic map of FIG. 7) is as follows:

/search/domain/Flood/topic/Asset_WorkEquipment/

Responsive to receiving this query input, asset and event compare program can determine whether the flood will affect a specific asset, the Asset_WorkEquipment.

In exemplary embodiments, asset and event compare program 66 obtains, from the query input, an input of the asset topic(s) and an input of the event to compare (step 205). The asset and event compare program 66 then identifies at least one asset mapped to the event in the asset to event topic map meta-model created at step 203 (step 206).

Asset and event compare program 66 causes asset(s) predicted to be affected by the event to be displayed (step 207). In at least one embodiment, asset and event compare program 66 causes to be displayed the asset(s) that have a probability greater than a threshold probability of being affected by the event. In at least one embodiment, asset and event compare program 66 can calculate the probability that an asset will be affected by an event using Bayesian methodology. In at least one embodiment, asset and event compare program 66 can cause the probability to be displayed. For example, asset and event compare program 66 can cause the probability to be displayed along with a range of probabilities. In another example, asset and event compare program 66 can cause the probability to be displayed in a form based on where the probability falls within the range of probabilities. For example, the color red could be used in a color-coded system to indicate a greater than 0.8 chance that an asset would be affected by an event.

If there are additional queries (step 208), return to step 204 of receiving a query input. If there are no additional queries (step 208), the method ends.

FIG. 3 shows an example of a possible relationship between an asset topic map meta-model 305, an event topic map meta-model 306, and an asset to event topic map meta-model 307 that maps assets in asset topic map meta-model 305 to events in event topic map meta-model 306.

Stored within a resource description framework (RDF) repository, for example repository 53, are RDF triples of the assigned topics, occurrences, and attributes of the assets topic map meta-model 305. An assets meta-model 303 in which assets topic map meta-model 305 is based may be stored within repository 53 or in a separate repository 301.

From a uniform modeling language (UML) representation 403 (shown in FIG. 4) of assets meta-model 303, the RDF triples in Table 1 below represent an association between an Asset_WorkEquipment being connected to the other pieces of Asset_WorkEquipment. The relationship between Asset_WorkEquipment and other pieces of Asset_WorkEquipment is the type "equipment_connects".

Note that for brevity in the following discussion, the following RDF namespace prefixes will be used, with (URLx) replacing an actual Uniform Resource Locator designation, or other designation of a location on a network:

TABLE 1

| Prefix | Prefix |
|---|---|
| rdf_syntax | http |
| Foo | (URL1) |
| Anne | (URL2) |

Therefore, for foo#asset_Workequiment_EquipmentConnects_Asset_WorkEquipment, the following RDF triples would be present for the association between WorkEquipment and Asset_WorkEquipment.

TABLE 2

| Subject | Predicate | Object |
|---|---|---|
| foo#asset_workequipment_equipmentconnects_asset_workequipment | rdf_syntax#type | anne#association |
| foo#asset_workequipment_equipmentconnects_asset_workequipment | foo#type | foo#equipment_connects |
| foo#asset_workequipment_equipmentconnects_asset_workequipment | ... | ... |

Stored within the resource description framework (RDF) repository, for example repository 53 are RDF triples of the assigned topics, occurrences, and attributes of event topic map meta-model 306. An event meta-model 304 in which event topic map meta-model 306 is based may be stored within repository 53 or in a separate repository 302.

From a UML representation 404 (shown in FIG. 5) of event meta-model 304, the RDF triples in Table 3 below represent an association between a Special EventObject being a type of EventObject. The relationship between Special EventObject and EventObject is the type "is_a". Therefore, for foo#specialEventObject_is_a_EventObject, the following RDF triples would be present for the association between Special EventObject and EventObject.

TABLE 3

| Subject | Predicate | Object |
|---|---|---|
| foo#specialEventObject_is_a_EventObject | Rdf-syntax#type | anne#association |
| foo#specialEventObject_is_a_EventObject | foo#type | foo#is_a |
| foo#specialEventObject_is_a_EventObject | ... | ... |

Figure 4:
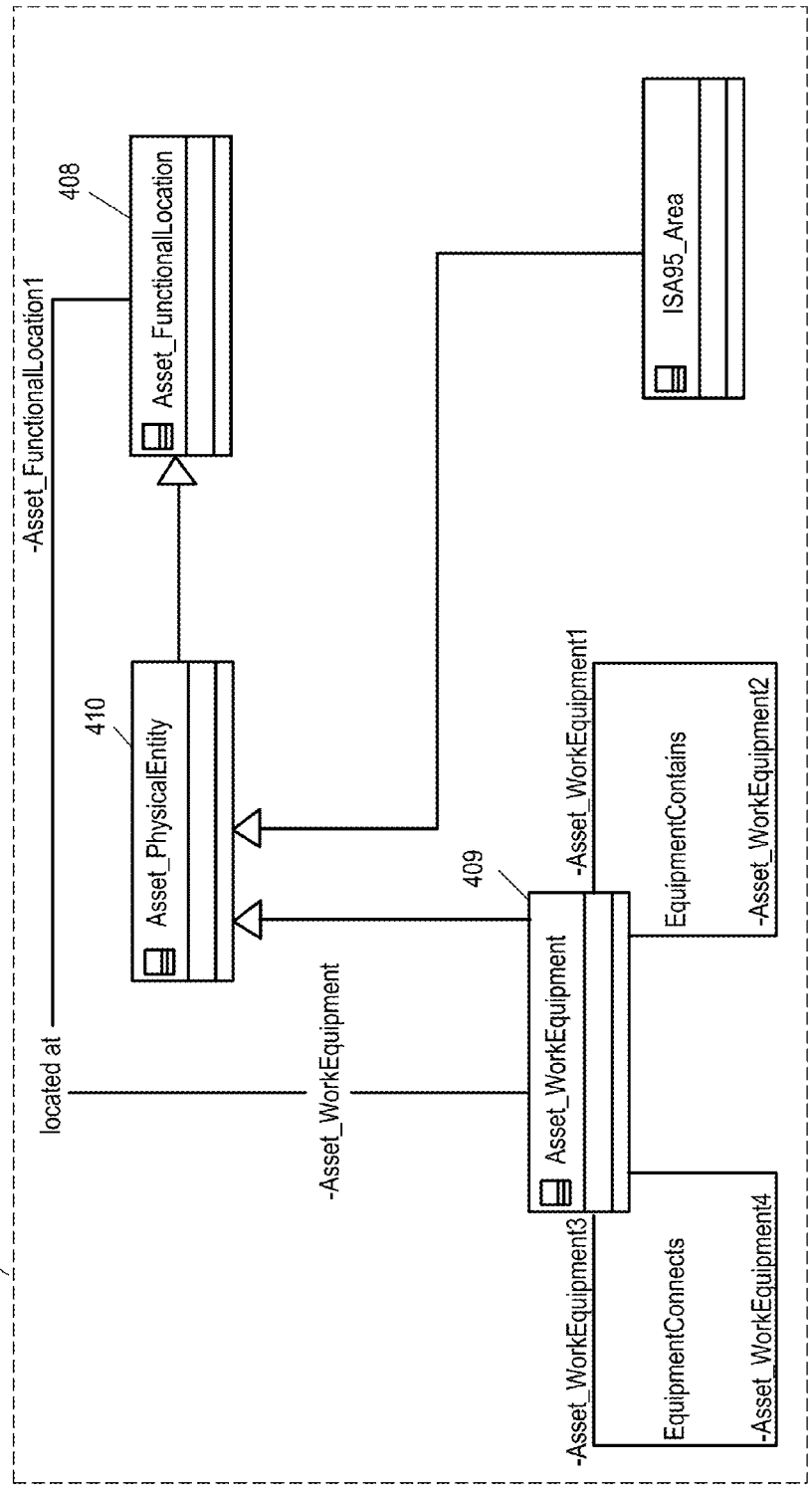
FIG. 4 shows an example of a UML representation of an asset meta-model.

FIG. 4 shows an example of UML representation 303 of asset meta-model 303. Asset_WorkEquipment 409 is located at or has an occurrence at Asset_FunctionalLocation 408. Asset_WorkEquipment 409 has the attributes or plays the role of equipment and is an Asset_PhysicalEntity 410. EquipmentContains, EquipmentConnects, and ISA95_Area shown in FIG. 4 are not shown in FIG. 8 in order to focus the relationships that will occur in the asset to event topic map meta-model of assets and events.

Figure 5:
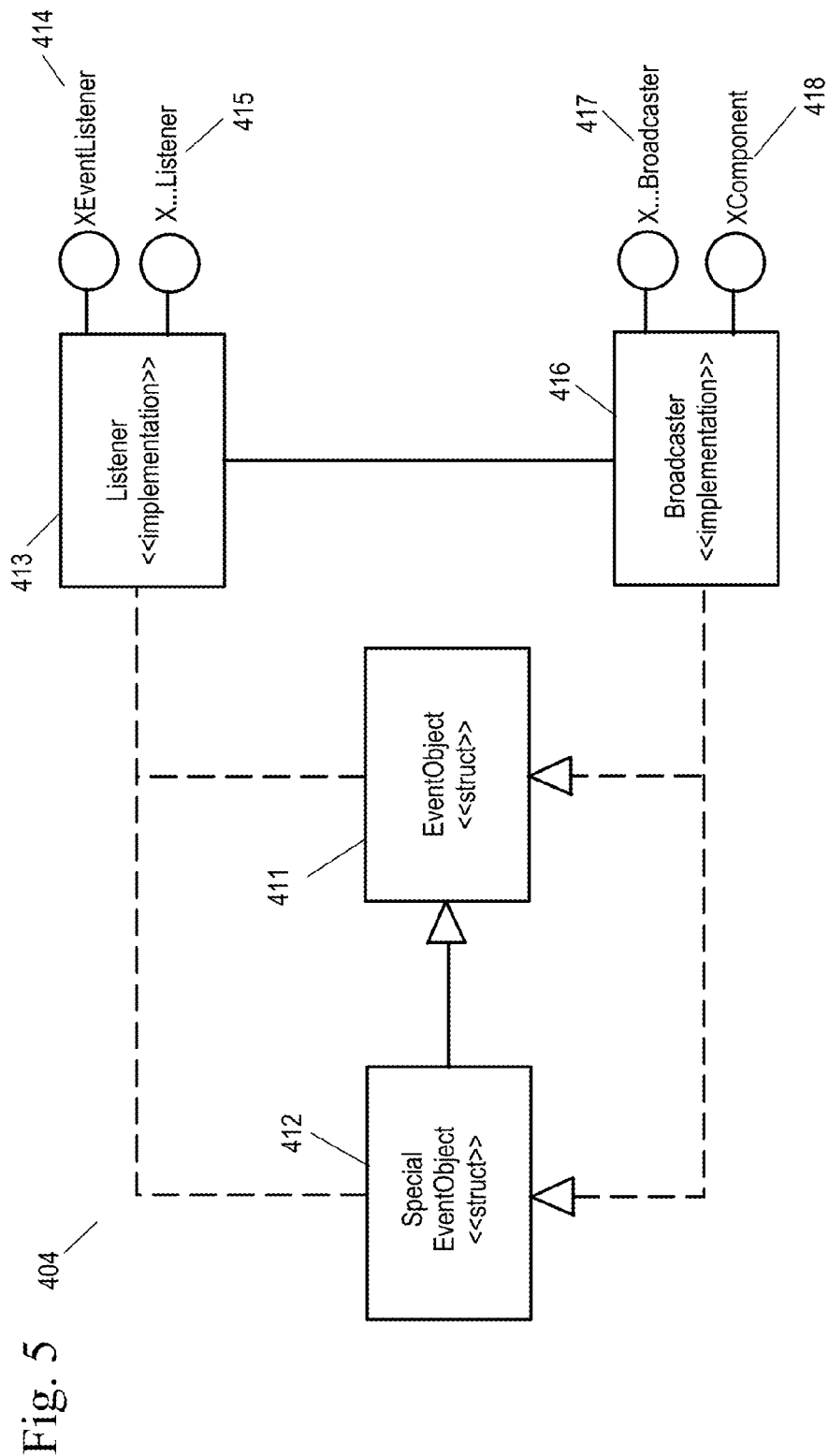
FIG. 5 shows an example of a UML representation of an event meta-model.

FIG. 5 shows an example of a UML representation 304 of event meta-model 304. A Broadcaster 416, which is an implementation of an event source and includes for example, X . . . Broadcaster 417 and XComponent 418, broadcasts events based on an EventListenerList to a Listener 413 (as shown by a solid line). It should be noted that for this application, the term "event" is defined as any predetermined occurrence that the event source considered significant enough to tell other objects about.

Listener 413 has event listeners, for example XEventListener 414 and X . . . Listener 415, which each receive information regarding event objects. An event object, for example EventObject 411 or Special EventObject 412, is an object that describes the nature of an event and stores properties and information regarding the event.

Broadcaster 416 is associated with EventObject 411 and Special EventObject 412 as shown by the dashed open arrowed lines. Special EventObject 412 is a type of EventObject 411 as indicated by the solid line and open arrow.

Figure 6:
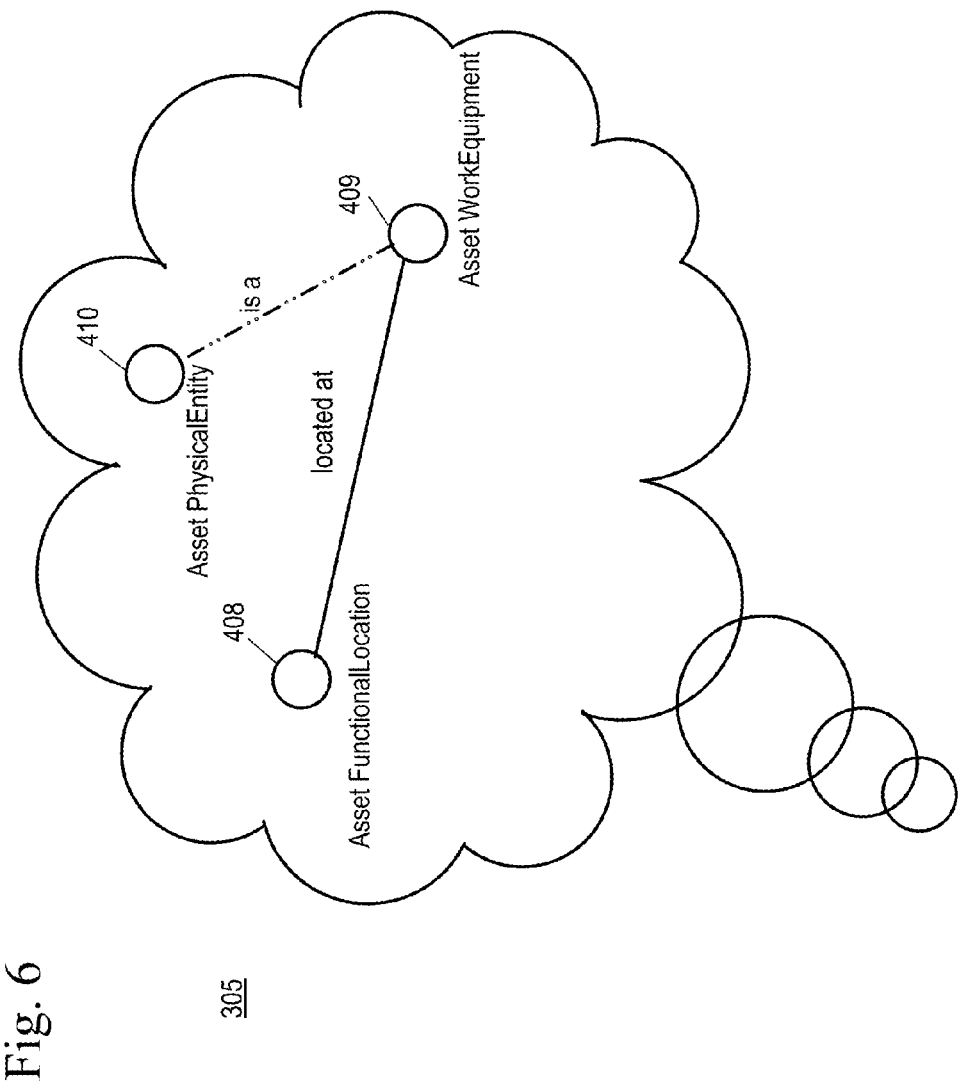
FIG. 6 shows an example of a portion of a topic map representation of an asset meta-model.

FIG. 6 shows an example of a portion of a topic map representation 305 of asset meta-model 303. In FIG. 6, the portion of the topic map representation 305 of asset meta-model 303 shows only the relationship between Asset_WorkEquipment 409 and Asset_FunctionalLocation 408, and between Asset_WorkEquipment 409 and Asset_PhysicalEntity 410.

In the portion of the topic map representation 305 shown in FIG. 6, the topic of Asset_WorkEquipment 409 is located at or has an occurrence at Asset_FunctionalLocation 408 (shown by a solid line). The topic of Asset_WorkEquipment 409 has the attributes or plays the role of equipment and is a Asset_PhysicalEntity 410 (shown by a dash-dot-dot line). The topic Asset_FunctionalLocation 408 has the attributes or plays the role of location.

Figure 7:
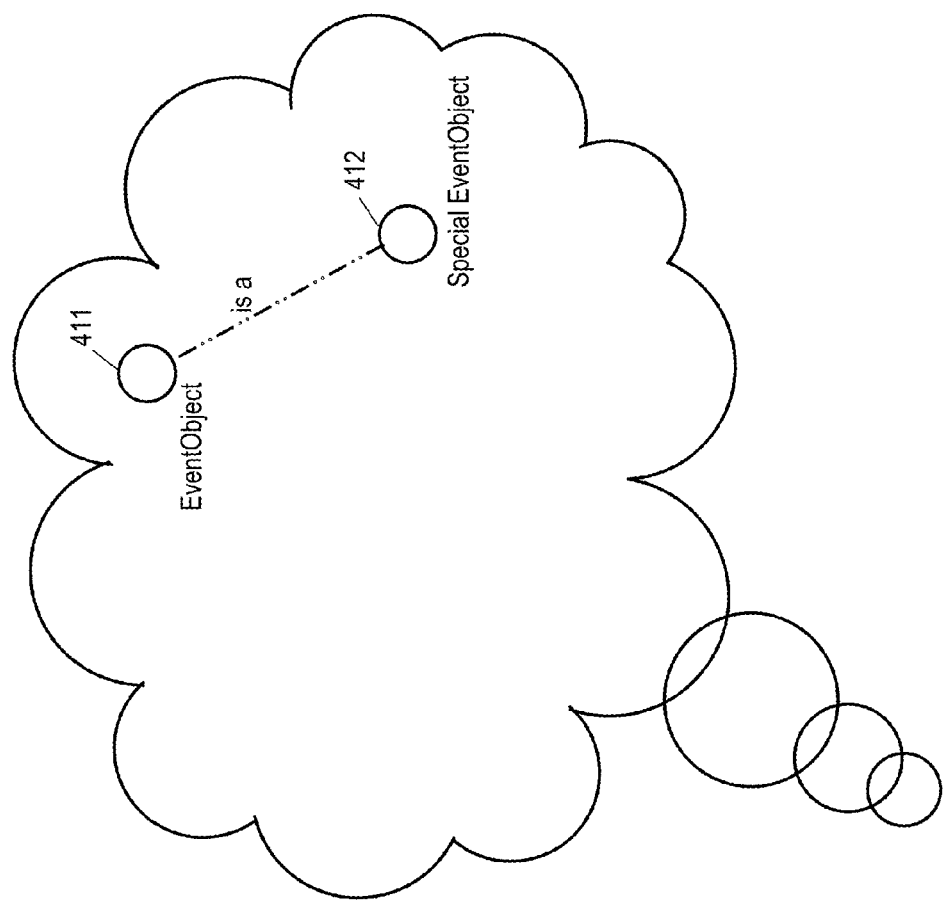
FIG. 7 shows an example of a portion of a topic map representation of an event meta-model.

FIG. 7 shows an example of a portion of a topic map representation 306 of event meta-model 304. In the portion of the topic map representation 306 shown in FIG. 7, the topic of Special EventObject 412 is an Event Object 411 (shown by the dash-dot-dot line). The topics of Listener and Broadcaster shown in FIG. 5 are not shown in FIG. 7 in order to focus the relationships that will occur in asset to event topic map meta-model 307.

Figure 8:
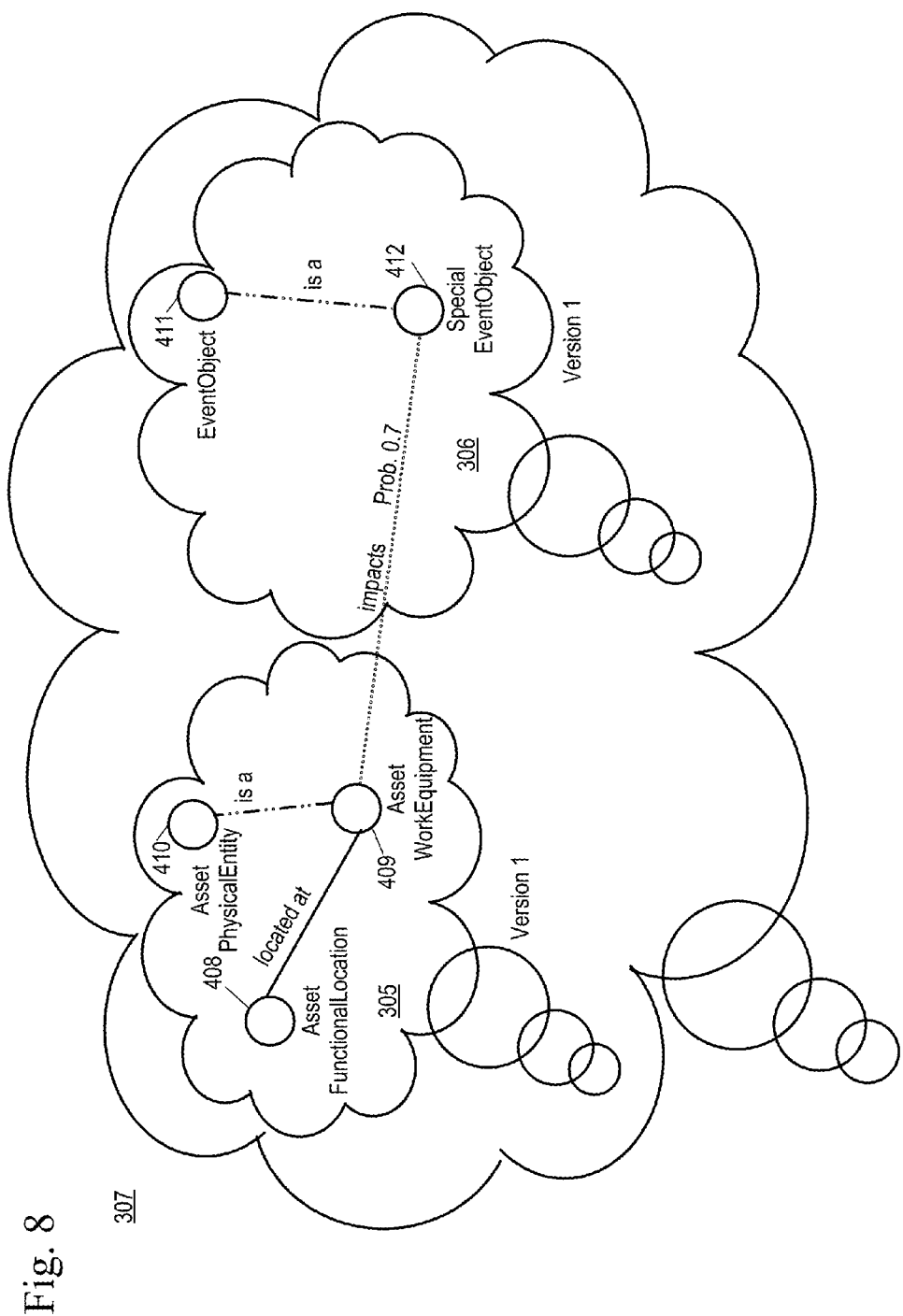
FIG. 8 shows an exemplary portion of a topic map representation of an asset to events meta-model.

FIG. 8 shows an exemplary portion of a topic map representation of the asset to event topic map meta-model 307. The asset to event topic map meta-model 307 includes topic map representation of assets of asset topic map meta-model 305 and a topic map representation of events of event topic map meta-model 306. The dotted line shows the asset topics that are impacted by an event topic being compared to the asset topics. As in FIGS. 6 and 7, the solid line indicates "located at", and the dash-dot-dot line indicates "is a". Therefore, Special EventObject 412, which "is an" EventObject 411, has an impact on Asset_WorkEquipment 409, but does not affect Asset_FunctionalLocation 408 or the fact that Asset_WorkEquipment 409 is an Asset_PhysicalEntity 410. The probability of Special EventObject 412 impacting Asset_WorkEquipment 409 is 0.7.

FIG. 9 illustrates internal and external components of client computer 52 and server computer 54 in which illustrative embodiments may be implemented. In FIG. 9, client computer 52 and server computer 54 include respective sets of internal components 800a, 800b, and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, topic map generator program 67 and asset and event compare program 66 are stored on at least one of one or more of the computer-readable tangible storage devices 830 for execution by at least one of one or more of the processors 820 via at least one of one or more of the RAMs 822 (which typically include cache memory). In the embodiment illustrated in FIG. 9, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information. The terms "computer readable tangible storage device" and "storage device" do not encompass a signal propagation medium, any description in this disclosure to the contrary notwithstanding.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Topic map generator program 67 and asset and event compare program 66 can be stored on at least one of one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Topic map generator program 67 and asset and event compare program 66 can be downloaded to client computer 52 and server computer 54 from an external computer via a network (for example, the Internet, a local area network or other, wide area network) and network adapter or interface 836. From the network adapter or interface 836, topic map generator program 67 and asset and event compare program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Topic map generator program 67 and asset and event compare program 66 can be written in various programming languages including low-level, high-level, object-oriented or non object-oriented languages. Alternatively, the functions of topic map generator program 67 and asset and event compare program 66 can be implemented in whole or in part by computer circuits and other hardware (not shown).

Based on the foregoing, a computer system, method and program product have been disclosed for predicting that an event will have an affect on at least one asset. However, numerous modifications and substitutions can be made without deviating from the scope of the present invention. Therefore, the present invention has been disclosed by way of example and not limitation.

What is claimed is:

1. A method of predicting that an event identified in a first topic map meta-model will have an effect on at least one asset identified in a second topic map meta-model, the method comprising the steps of:
   a computer creating a third topic map meta-model which maps at least one asset from the second topic map meta-model to an event from the first topic map meta-model, the third topic map meta-model comprising:
      a topic map representation of assets of the second topic map meta-model, the second topic map meta-model further comprising a topic map based index and instance ontology of a meta-model of assets; and
      a topic map representation of events of the first topic map meta-model, the first topic map meta-model further comprising a topic map based index and instance ontology of a meta-model of events;
   the computer receiving a query input from a user identifying an event; and
   the computer identifying at least one asset mapped to an event corresponding to the event identified in the query input in the third topic map meta-model wherein the step of identifying the at least one asset comprises the computer determining that the at least one asset has greater than a threshold probability of being affected by the event identified in the query input.

2. The method of claim 1, further comprising the step of the computer causing display of a probability that the event corresponding to the event identified in the query input will affect the mapped at least one asset.

3. The method of claim 2, wherein the step of causing display of the probability comprises the computer causing display of the probability based on where the probability falls within a range of probabilities that the event corresponding to the event identified in the query input will affect the mapped at least one asset.

4. The method of claim 1, further comprising the step of the computer identifying an asset from the query input.

5. The method of claim 1, further comprising the step of the computer calculating the probability using Bayesian methodology.

6. The method of claim 1, further comprising the steps of: the computer storing the third topic map meta-model in a repository.

7. The method of claim 1, wherein the step of creating the third topic map meta-model comprises the computer creating the third topic map meta-model based on historical outcomes of events on assets.

8. The method of claim 1, wherein the step of creating the third topic map meta-model comprises the computer creating the third topic map meta-model based on a probable effect of a particular event on assets, the probable effect being based on historical effects of events similar to the particular event.

9. The method of claim 1, further comprising the steps of: in response to a new event being added to the first topic map meta-model, the computer re-creating the third topic map meta-model for the new event, the re-created third topic map meta-model including a topic map based index and instance ontology for the new event.

10. A computer program product for predicting that an event identified in a first topic map meta-model will have an effect on at least one asset identified in a second topic map meta-model, the computer program product comprising:
  one or more non-transitory computer-readable tangible storage devices;
  program instructions, stored on at least one of the one or more storage devices, to create a third topic map meta-model which maps at least one asset from the second topic map meta-model to an event from the first topic map meta-model, the third topic map meta-model comprising:
    a topic map representation of assets of the second topic map meta-model, the second topic map meta-model further comprising a topic map based index and instance ontology of a meta-model of assets; and
    a topic map representation of events of the first topic map meta-model, the first topic map meta-model further comprising a topic map based index and instance ontology of a meta-model of events;
  program instructions, stored on at least one of the one or more storage devices, to receive a query input from a user identifying an event;
  program instructions, stored on at least one of the one or more storage devices, to identify at least one asset mapped to an event corresponding to the event identified in the query input in the third topic map meta-model, wherein the program instructions to identify the at least one asset determine that the at least one asset has greater than a threshold probability of being affected by the event identified in the query input; and
  program instructions, stored on at least one of the one or more storage devices, to cause the display of a probability that the event corresponding to the event identified in the query input will affect the mapped at least one asset.

11. The computer program product of claim 10, wherein the program instructions to cause the display of the probability that the event corresponding to the event identified in the query input will affect the mapped at least one asset display the probability based on where the probability falls within a range of probabilities that the event corresponding to the event identified in the query input will affect the mapped at least one asset.

12. The computer program product of claim 11, further comprising program instructions, stored on at least one of the one or more storage devices, to display the range of probabilities using different colors.

13. The computer program product of claim 10, further comprising program instructions, stored on at least one of the one or more storage devices, to calculate the probability using Bayesian methodology.

14. The computer program product of claim 10, further comprising:
  program instructions, stored on at least one of the one or more storage devices, to store the third topic map meta-model in a repository.

15. The computer program product of claim 10, wherein the program instructions to create the third topic map meta-model create the third topic map meta-model based on historical outcomes of events on assets.

16. The computer program product of claim 10, wherein the program instructions to create the third topic map meta-model create the third topic map meta-model based on a probable effect of a particular event on assets, the probable effect being based on historical effects of events similar to the particular event.

17. The computer program product of claim 10, further comprising:
  program instructions, stored on at least one of the one or more storage devices, to in response to a new event being added to the first topic map meta-model, re-create the third topic map meta-model for the new event, the re-created third topic map meta-model including a topic map based index and instance ontology for the new event.

18. A computer system for predicting that an event identified in a first topic map meta-model will have an effect on at least one asset identified in a second topic map meta-model, the computer system comprising:
  one or more processors, one or more computer-readable memories, and one or more computer-readable tangible storage devices;
  program instructions, stored on at least one of the one or more storage devices for execution by at least one of the one or more processors via at least one of the one or more memories, to create a third topic map meta-model which maps at least one asset from the second topic map meta-model to an event from the first topic map meta-model, the third topic map meta-model comprising:
    a topic map representation of assets of the second topic map meta-model, the second topic map meta-model further comprising a topic map based index and instance ontology of a meta-model of assets; and
    a topic map representation of events of the first topic map meta-model, the first topic map meta-model further comprising a topic map based index and instance ontology of a meta-model of events;
  program instructions, stored on at least one of the one or more storage devices for execution by at least one of the one or more processors via at least one of the one or more memories, to receive a query input from a user identifying an event;
  program instructions, stored on at least one of the one or more storage devices for execution by at least one of the one or more processors via at least one of the one or more memories, to identify at least one asset mapped to an event corresponding to the event identified in the query input in the third topic map meta-model, wherein the program instructions to identify the at least one asset comprises determining that the at least one asset has greater than a threshold probability of being affected by the event identified in the query input; and
  program instructions, stored on at least one of the one or more storage devices for execution by at least one of the one or more processors via at least one of the one or more memories, to cause the display of a probability that the event corresponding to the event identified in the query input will affect the mapped at least one asset.

19. The computer system of claim 18, wherein the program instructions to cause the display of the probability that the event corresponding to the event identified in the query input will affect the mapped at least one asset display the probability based on where the probability falls within a range of probabilities that the event corresponding to the event identified in the query input will affect the mapped at least one asset.

20. The computer system of claim 19, wherein the range of probabilities are displayed through different colors.

21. The computer system of claim 18, further comprising program instructions, stored on at least one of the one or more storage devices for execution by at least one of the one or more processors via at least one of the one or more memories, to calculate the probability using Bayesian methodology.

22. The computer system of claim 18, further comprising: program instructions, stored on at least one of the one or more storage devices for execution by at least one of the one or more processors via at least one of the one or more memories, to store the third topic map meta-model in a repository.

23. The computer system of claim 18, wherein the program instructions to create the third topic map meta-model create the third topic map meta-model based on historical outcomes of events on assets.

24. The computer system of claim 18, wherein program instructions to create the third topic map meta-model create the third topic map meta-model based on a probable effect of a particular event on assets, the probable effect being based on historical effects of events similar to the particular event.

25. The computer system of claim 18, further comprising: program instructions, stored on at least one of the one or more storage devices for execution by at least one of the one or more processors via at least one of the one or more memories, to, in response to a new event being added to the first topic map meta-model, re-create the third topic map meta-model for the new event, the re-created third topic map meta-model including a topic map based index and instance ontology for the new event.

* * * * *